United States Patent Office 3,701,806
Patented Oct. 31, 1972

3,701,806
PROCESS FOR PREPARING A MIXTURE OF AROMATIC SULFONES AND AROMATIC SULFONYL CHLORIDES
Michael J. Keogh, Piscataway, and Arthur K. Ingberman, Somerville, N.J., assignors to Union Carbide Corporation
No Drawing. Filed June 10, 1966, Ser. No. 556,591
Int. Cl. C07c 143/70, 147/06
U.S. Cl. 260—543 R                9 Claims

ABSTRACT OF THE DISCLOSURE

Mixtures of aromatic sulfones and sulfonyl chlorides are prepared by reacting an aromatic compound having the formula:

where X is hydrogen, fluoro, chloro, bromo, or methyl with a mixture of sulfur trioxide and thionyl chloride.

---

This invention relates to the preparation of mixtures of aromatic sulfones and sulfonyl chlorides essentially free of the corresponding aromatic sulfonic acid or its respective anhydride.

The reaction of aromatic sulfonic acid with thionyl chloride is known. This reaction always leads to a complex mixture of compounds composed at least of the following species:

ArSO₃H

ArSO₂Cl

ArSO₂Ar

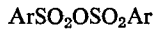
ArSO₂OSO₂Ar wherein Ar is an aromatic moiety.

Diaryl sulfones are important useful organic compounds. For example, 4,4'-dichlorodiphenyl sulfone is an important monomer in the preparation of polyarylene polyethers such as those disclosed in Belgian Pat. 650,476. The present invention provides a mixture from which 4,4'-dichlorodiphenyl sulfone can be readily isolated. More importantly, the para-chlorobenzenesulfonyl chloride in the mixture can be reacted with chlorobenzene, without isolating the 4,4'-dichlorodiphenyl sulfone present therein, in the presence of ferric chloride (FeCl₃) according to the process disclosed in U.S. Pat. 2,224,964 to produce 4,4'-dichlorodiphenyl sulfone in high overall yields.

The advantage to the use of FeCl₃ as taught in U.S. Pat. 2,224,964 is that it need be used only in catalytic amounts. However, aryl sulfonic acids or their respective anhydrides are typically present in the reaction mixture, and they react and consume the FeCl₃ in one of two ways:

(a) The FeCl₃ is rendered inactive by precipitation and ultimately conversion to sulfone can be achieved only by adding disadvantageously large quantities of FeCl₃, or (b) The entire reaction gels irreversibly and must be discarded.

Broadly the process of this invention for preparing a mixture of aromatic sulfonyl chlorides and aromatic sulfones free of the corresponding aromatic sulfonic acids and their anhydrides (which acids or anhydrides, if present, would deactivate or consume catalysts such as FeCl₃ in the subsequent conversion of the aromatic sulfonyl chlorides to aromatic sulfones) which comprises reacting a mono substituted benzene having the formula

wherein X is hydrogen, fluoro, chloro, bromo or methyl and sulfur trioxide (SO₃) in the presence of at least a stoichiometric amount of thionyl chloride (SOCl₂), and preferably an excess of thionyl chloride.

For convenience, the above formula for the mono substituted benzenes will be referred to herein as ArX.

It has been found that when SO₃ is permitted to contact mono substituted benzenes (ArX) in the presence of at least a stoichiometric amount of thionyl chloride, and preferably an excess of thionyl chloride, an essentially pure mixture ArSO₂Cl and ArSO₂Ar is formed, in yields generally above about 90%.

The mechanism for this invention is thought to be as follows: The intermediate in the reaction between SO₃ and ArX is captured by thionyl chloride to form a relatively more stable, but still thermally labile intermediate. Heating affects decomposition to yield a mixture of diaryl sulfone, aryl sulfonyl chloride and equivalent amounts of SO₂ and HCl.

It is known that a mixture formed by the reaction of thionyl chloride and aromatic sulfonic acids can be purified to remove the sulfonic acid and/or its anhydride in a variety of methods. For example, extraction with hot water yields a useful mixture of aromatic sulfonyl chlorides and sulfones, but this requires additional steps with very substantial losses of sulfone product. The primary advantage of this invention is that essentially only aromatic sulfonyl chlorides and sulfones are formed in high yield, requiring no further purification for complete conversion to diaryl sulfones with catalysts such as: FeCl₃, AlCl₃, SbCl₃, SnCl₄ and the like.

It is desirable that thionyl chloride efficiently capture the SO₃ArX intermediate. This is accomplished by providing the reactor with efficient agitation or circulation of reaction mass and excess thionyl chloride.

The stoichiometry of this process of this invention is represented by the following equation:

$$SO_3 + SOCl_2 + 2ArX \rightarrow m - ArSO_2Cl + (1-m)ArSO_2Ar + 1SO_2 + [(1-m)_2 + m]HCl$$

wherein m is a positive integer number between 0 and 1, and is generally dependent on the structure of ArX, and the reaction conditions.

Sulfur trioxide, according to the present invention can only be reacted with a mixture of ArX and thionyl chloride because, in the absence of thionyl chloride, sulfur trioxide and ArX react to give high yields of aromatic sulfonic acid which, as described previously, is an undesirable by-product. Moreover, treatment of aromatic sulfonic acid with thionyl chloride does not produce only the corresponding sulfonyl chloride, but instead, promotes the formation of substantial quantities of the acid anhydride. These reactions can be illustrated as follows

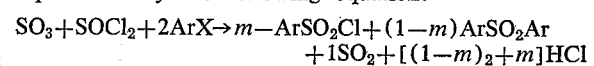

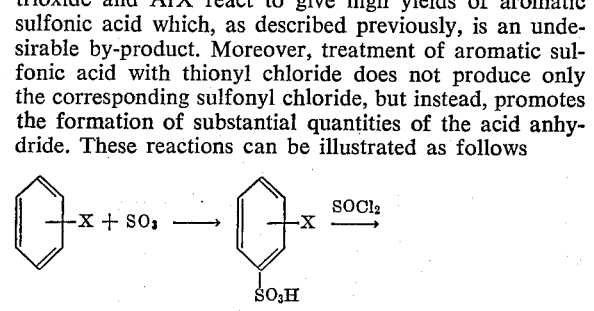

Gaseous and liquid SO₃ are essentialy interchangeable in this invention. The stoichiometry of the reaction requires substantially equimolar quantities of SOCl₂ and SO₃, and although the invention is not too sensitive to small deficiencies in $SOCl_2$, it should be used in stoichiometric amounts. Preferably from about 10 to about 50 mole percent excess thionyl chloride based on $SO_3$ is employed.

The process is not critical with respect to the mole ratios or $ArX:SO_3$. Mole ratios as low as 1.5:1 are useable. From a practical standpoint the ratio of $ArX:SO_3$ does not generally exceed 6:1.

It is desirable but not critical to the successful practice of this invention to employ efficient mixing such as, high shear agitation or the like.

The reaction of sulfur trioxide with a mixture of ArX and thionyl chloride is exothermic and may be controlled by external cooling to prevent volatilization of sulfur trioxide, which reduces yields, and the formation of undesirable by-products. Temperatures of from above the freezing point of the reactants to about 130° C. are suitable and temperatures in the range of from about 20° C. to about 50° C. are preferred.

The process of this invention proceeds readily without the need of a catalyst. It has been found, however, that small amounts about less than 5% of $SCl_2$, $S_2Cl_2$, $SCl_2/S_2Cl_2$ act as promoters in the reaction to increase the yields of the desired products.

Thionyl bromide can be used interchangeably with thionyl chloride. Thus as used herein, the term "thionyl chloride", is intended to include thionyl bromide.

The process of this invention is most advantageously run in an excess of ArX which can then act as the solvent. Other solvents useful in this process include nitrobenzene, $SO_2$, and other liquids known to be relatively inert with respect to $SO_3$, such as phosphorus oxychloride ($POCl_3$), $SOCl_2$, $CF_2=CF_2$ and the like.

The order in which the reagents are mixed is not narrowly critical. The reaction can advantageously be carried out continuously by simply contacting the reactant in any convenient manner provided thionyl chloride is always present in at least stoichiometric amounts when $SO_3$ is permitted to contact ArX.

The following examples are intended to illustrate this invention without limiting the same. All parts and percentages are by weight unless indicated otherwise.

GENERAL PROCEDURE

Into a four-inch, one-liter resin kettle equipped with a thermometer, dropping funnel, condenser, air adapter for removing distillate, an inlet for nitrogen, and means for agitation, was placed chlorobenzene and thionyl chloride. Stabilized liquid sulfur trioxide (Sulfan) was added dropwise. The reaction is highly exothermic. After the sulfur trioxide addition was complete, heat was applied and sulfur dioxide and hydrogen chloride was driven from the reaction mixture. Heating is continued to distill excess thionyl chloride with some chlorobenzene. Analysis of the reaction products was carried out by vapor phase chromotography (VPC). Results are summarized in the table. The indication of no gel upon exposure to $FeCl_3$ indicates the absence of the corresponding aromatic sulfonic acid and their anhydrides.

TABLE

| Example No. | X in ArX | Grams ArX | Moles ArX | Grams $SOCl_2$ | Moles $SOCl_2$ | Grams $SO_3$ | Moles $SO_3$ | $SO_3$ addition time, min. | Reaction temp. °C. | Agitation | VPC analysis Percent ArX | Percent $ArSO_2Cl$ | Percent $(XAr)_2SO_2$ | Reaction to $FeCl_3$ | Weight ratio $(XAr)_2SO_2/XArSO_2Cl$ |
|---|---|---|---|---|---|---|---|---|---|---|---|---|---|---|---|
| 1 | Cl | 675 | 6 | 264 | 2.2 | 163 | 2 | 46 | 15-25 | None | 41.8 | 15.6 | 42.6 | No gel | 2.7 |
| 2 | Cl | 675 | 6 | 264 | 2.2 | 163 | 2 | 38 | 20-23 | A 1,200 r.p.m. | | | | No gel | |
| 3 | Cl | 675 | 6 | 400 | 3.3 | 164 | 2 | 84 | 17-30 | A 2,000 r.p.m. | | | | No gel | |
| 4 | Cl | 675 | 6 | 400 | 3.3 | 164 | 2 | 45 | | A 2,000 r.p.m. | | | | No gel | |
| 5 | Cl | 675 | 6 | 400 | 3.3 | 162 | 2 | 53 | 60-65 | A 1,5000-2,000 rpr.m. | 33.4 | 33.7 | 32.6 | No gel | 0.97 |
| 6 | Cl | 675 | 6 | 400 | 3.3 | 162 | 2 | 37 | −20 to −32 | A | 31.6 | 42.3 | 26.0 | No gel | 0.62 |
| 7 | Cl | 675 | 6 | 264 | 2.2 | 160 | 2 | 75 | 110 | B[2] | | | | No gel | |
| 8 | Cl | 675 | 6 | 360 | 3.0 | 160 | 2 | 57 | 68-70 | B | | | | No gel | |
| 9 | Br | 492 | 4.4 | 312 | 2.6 | 159 | 2 | | 15-19 | | 20.3 | 37.2 | 42.1 | No gel | 1.13 |
| 10 | H | 300 | 3.8 | 240 | 2.0 | 82.2 | 1 | 83 | 13-16 | A 2,000 r.p.m. | | | | No gel | |
| 11 | Br | 785 | 5.0 | 360 | 3.0 | 160 | 2 | 61 | 3-24 | A 1,5000 r.p.m. | | | | No gel | 1.154 |
| 12 | Br | 460 | 5.0 | 360 | 3.0 | 160 | 2 | 36 | 13-25 | A 1,500-2,000 r.p.m. | | | | No gel | 0.85 |
| 13 | $CH_3$ | 460 | 5.0 | 360 | 3.0 | 160 | 2 | 38 | 18-25 | A 1,500-2,000 r.p.m. | | | | No gel | 0.33 |
| 14 | F | 192.2 | 2.0 | 180 | 1.5 | 160 | 1 | 30 | 3 | A 1,500-2,000 r.p.m. | | | | No gel | 0.44 |

[1] 3-inch Duplex Dispersator.
[2] Cowles Dissolver.

We claim:
1. Process for preparing a mixture of aromatic sulfonyl chlorides and aromatic sulfones free of the corresponding aromatic sulfonic acids and their anhydrides which comprises reacting a compound having the formula

wherein X is hydrogen, fluoro, chloro, bromo or methyl with sulfur trioxide in the presence of at least a stoichiometric amount of thionyl chloride at a temperature from above the freezing point of the reactants to about 130° C.

2. Process of claim 1 wherein up to about 50 mole percent excess of thionyl chloride based on the sulfur trioxide is employed.

3. Process of claim 1 wherein from about 10 to about 50 mole percent excess of thionyl chloride based on the sulfur trioxide is employed.

4. Process of claim 1 wherein said reaction is carried out at a temperature of from above 20° C. to about 50° C.

5. Process of claim 1 wherein said reaction is carried out with mixing.

6. Process of claim 1 wherein the mole ratio of said compound to sulfur trioxide is from about 1.5:1 to about 6:1.

7. Process of claim 1 wherein said sulfur trioxide is in the liquid state.

8. Process for preparing a mixture of aromatic sulfonyl chlorides and aromatic sulfones free of the corresponding aromatic sulfonic acids and their anhydrides which comprises reacting at a temperature of from about 20° C. to about 50° C. a compound having the formula

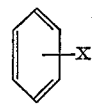

wherein X is hydrogen, fluoro, chloro, bromo or methyl and liquid sulfur trioxide in a mole ratio of from about 1.5:1 to about 6:1 in the presence of from about 10 to about 50 mole percent excess of thionyl chloride based on the sulfur trioxide with high speed shear agitation.

9. Process of claim 9 wherein X is chloro.

References Cited
UNITED STATES PATENTS
2,000,061   5/1935   Carr _____ 260—607 A
3,355,497   11/1967   Budnick _____ 260—607 A

FOREIGN PATENTS
135,482   5/1960   USSR.

OTHER REFERENCES
Houben-Weyl, Methoden der Organischen Chemie, vol. 9 (1955), pp. 578–579.
Wagner and Zook, Synthetic Org. Chem., p. 548.
Houben-Weyl, Methoden der Org. Chemie., Band IX, p. 556.

LORRAINE A. WEINBERGER, Primary Examiner
E. J. SKELLY, Assistant Examiner

U.S. Cl. X.R.
260—607 A

PO-1050
(5/69)

UNITED STATES PATENT OFFICE
CERTIFICATE OF CORRECTION

Patent No. 3,701,806              Dated October 31, 1972

Inventor(s) Michael J. Keogh and Arthur K. Ingberman

It is certified that error appears in the above-identified patent and that said Letters Patent are hereby corrected as shown below:

Column 6, line 12, "9. Process of claim 9" should read --9. Process of claim 8--.

Signed and sealed this 6th day of March 1973.

(SEAL)
Attest:

EDWARD M. FLETCHER, JR.            ROBERT GOTTSCHALK
Attesting Officer                     Commissioner of Patents